UNITED STATES PATENT OFFICE.

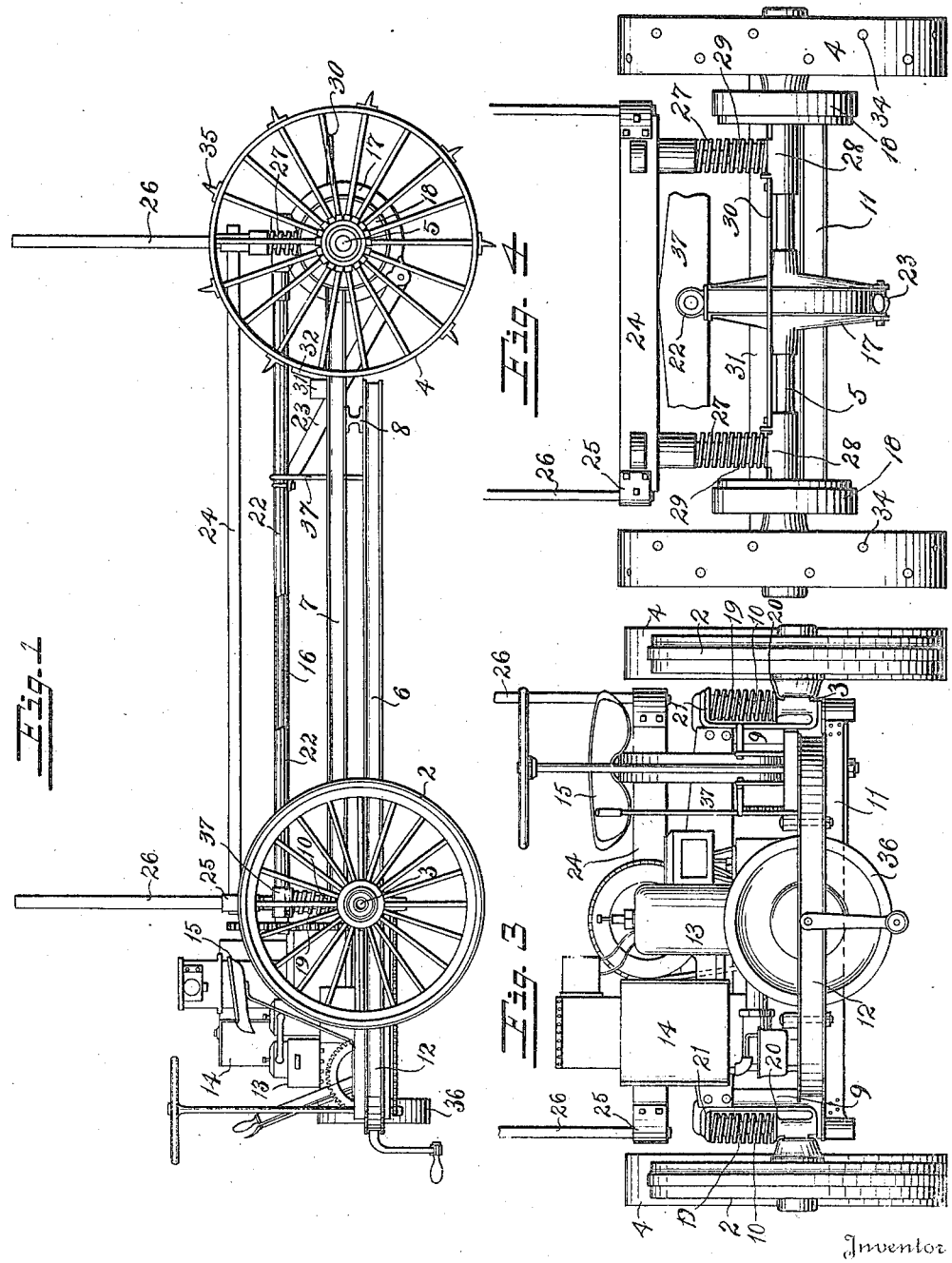

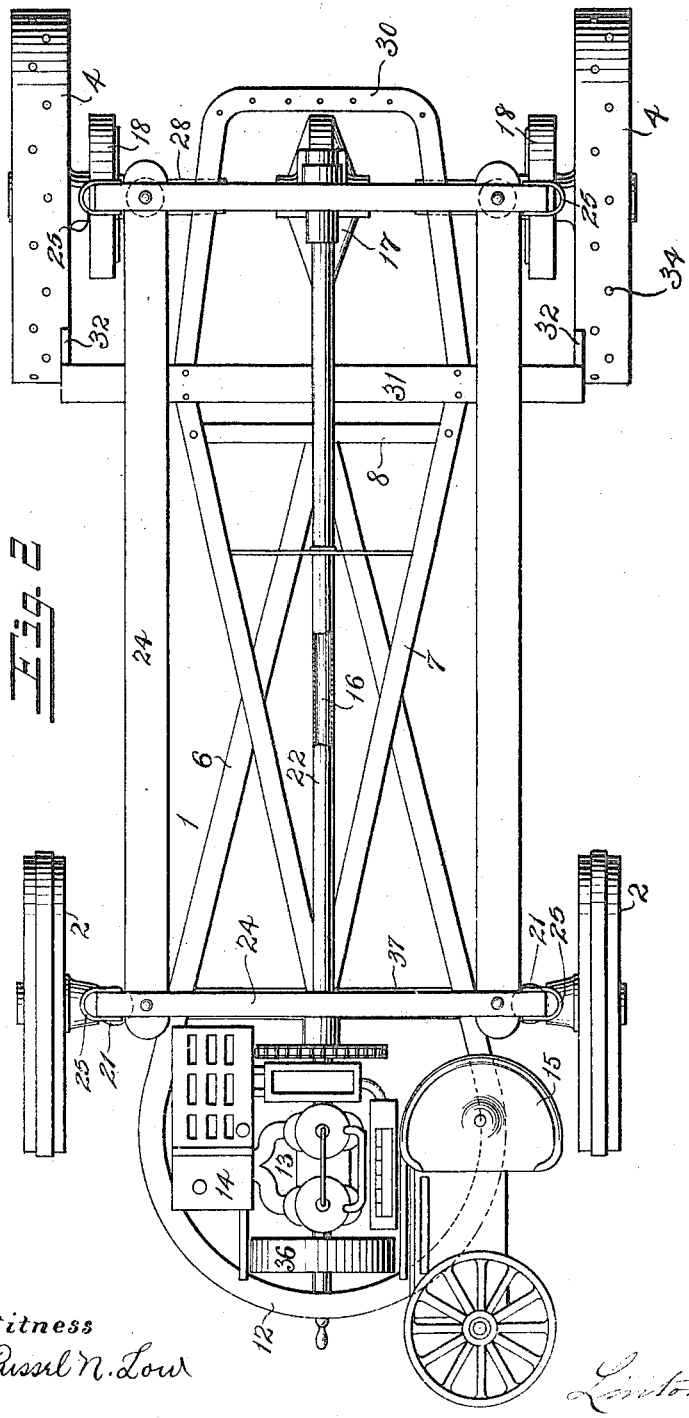

LINTON T. BASSETT, OF CARTHAGE, MISSOURI.

MOTOR-TRUCK.

1,231,474.  Specification of Letters Patent.  Patented June 26, 1917.

Application filed September 28, 1915. Serial No. 52,997.

*To all whom it may concern:*

Be it known that I, LINTON T. BASSETT, a citizen of the United States, residing at Carthage, in the county of Jasper and State of Missouri, have invented certain new and useful Improvements in Motor-Trucks, of which the following is a specification.

My invention relates to a motor truck that is especially adapted for use upon the farm, and has for its object to improve the truck, particularly as to its running gear, so as to adapt it for general uses and more particularly for meeting conditions incident to farm work.

In the accompanying drawings—

Figure 1 is a side elevation of a truck embodying my improvements;

Fig. 2 is a top plan view thereof;

Fig. 3 is a front elevation;

Fig. 4 is a rear elevation.

The running gear consists essentially of two frames each of V-shape, supported respectively by the front and the rear wheels of the vehicle, one above the other and so as to cross each other.

2, 2 indicate the front and steering wheels, they being supported upon knuckles or short-turning stub axles 3, of any approved construction, and 4, 4, the rear, drive, wheels loosely supported upon the rear cross axle 5. 6 indicates a V-shaped frame supported at its wide end by the front wheels, and 7, a V-shaped frame supported at its wide end by the rear wheels. These frames are preferably formed of metal, channel bars or light I-beams being used for this purpose. They are suitably united and braced for strength. They overlie one another, as represented in Figs. 1 and 2, the frame 6 being preferably below the frame 7. A cross-bar 8 is supported by the frame 7, extending between its diverging members near their rear ends and serves as the part to which the rear end or apex of the frame 6 is connected.

9, 9 are the brackets in which are supported the vertical spindles or shafts 10 of the stub axles 3 that carry the front wheels, there being provided two bearings for each spindle in which it is free to slide, one directly below the stub axle 3 and the other considerably above it. The forward ends of the diverging members of the frame 6 are suitably secured to a transverse beam or bar 11 uniting the two brackets.

A curved supporting frame 12 suitably secured to the transverse bar 11, and which if desired may be integral with the frame 6 extends forward beyond a transverse line passing through the axes of the spindles 10 of the stub axles, and supports the motor 13, which may be of any suitable type, as for instance an internal combustion gasolene engine, a gasolene tank 14, a driver's seat 15, and such other accessory parts as may go to make up a motor vehicle, it being unnecessary to here describe, or in the drawings to specifically illustrate, such parts, as they may be varied in character and arrangement very considerably without affecting the invention.

Power is taken from the motor through a longitudinal drive shaft 16, extending from the motor rearwardly to and into a casing 17, supported upon the rear axle 5, in which casing is mounted and inclosed the worm gearing between the drive shaft and the rear axle. Clutches, preferably of the automatically operating frictional type, and indicated as a whole by 18, are interposed between the axle 5 and the rear drive wheels 4. The particular character and construction of these clutches is not material to the present invention, and they are therefore not illustrated in detail.

The forwardly extending frame 12 supporting the motor and other parts, is spring-supported as follows: Coiled springs 19 surround the spindles 10 of the front stub axles, resting at their lower ends upon seats 20 provided for them upon the knuckles or short-turning axle members, and have their upper ends bearing against the overhanging portions 21 of the brackets 9, in which are formed the upper bearings of the spindles 10. The longitudinal drive shaft 16 is preferably mounted within a tubular sheath 22, that constitutes part of the running gear, and is preferably seated in the front cross beam 37, and united with the casing 17. An inclined brace 23 is secured to the sheath near its middle portion and extends thence downwardly and rearwardly to the casing 17 to which it is united, the sheath 22 and the brace thus rigidly holding the casing in proper position upon the rear axle.

The drive shaft 16 and its inclosing sheath 22 are preferably substantially horizontal, that is to say, are approximately parallel with the wheel base, and are arranged above the wheel-connecting parts of the truck frame. This causes the sheath 22 to be united with the gear casing 17 at its highest point; and I therefore connect the inclined brace 23 with the lower portion of the gear casing, so that the sheath 22, brace 23, and gear casing 17, together constitute a substantially triangular frame, at about the middle of the base of which is located the rear shaft, and the apex of which is on the sheath 22 where the brace unites therewith.

When the truck is under heavy traction, as in pulling plows, there is a decided tendency to lift the front end of the truck, which is resisted by the arrangement of the motor and associated parts in advance of the front axle as described. In order to distribute this lifting strain I employ the inclined brace 23 just described, and also preferably arrange a transverse brace 37 that is secured to the sheath 22, in proximity to the place, in its length, where the brace 23 is united thereto, and extend it laterally and downwardly to the frame 6 to which its ends are secured. This arrangement I have found efficient and desirable.

Upon the running gear and in rear of the motor, is mounted an upper frame adapted to support a wagon body, hay rack, platform, or other structure, such as may be useful as the load support or receiver of a farm motor truck. The frame 24 is preferably of rectangular form and of suitable construction and strength. It preferably carries sockets 25 in which may be mounted stakes 26 for supporting a wagon body or for other uses. The forward end of the frame 24 preferably rests upon the cross beam 37, the frame being thus spring-supported at the front end, because the frame of which the beam 11 is a part rests upon the springs 19. The rear portion of the frame 24 is supported by the coiled springs 27. These are seated upon the bearings 28, through which the rear transverse drive shaft passes, and surround posts 29 provided therefor and extending upwardly from the bearings 28.

30 represents a rear draw bar. It is preferably in the form of a transversely arranged bent bar secured at its forward ends to or forming part of the frame 7, and supported farther to the rear by the bearings 28 to which it is secured. This draw bar is preferably perforated to provide for attaching clevises or other draft devices at various points as may be required.

The truck is provided with a brake comprising a beam 31 carrying brake shoes 32 that bear upon the rear wheels. The brake shoes are of less width than the tires of the rear wheels and bear upon the latter near their inner edges. The central and outer portions of the rims of the drive wheels are perforated, as indicated at 34, to permit the attachment of spurs or traction lugs 35 that may be applied to the wheels when needed. In making the brake shoes narrow as described and mounting them so that they bear upon the inner portions of the wheel rims, the brakes may still be used when the traction spurs 35 are in use. The mechanism for operating the brake forms no part of the invention, and is therefore not illustrated.

The engine is provided with a fly wheel 36 that is supported in the extreme forward portion of the supporting frame 12. This wheel is adapted to serve as a belt wheel for the engine when used as a stationary motor for driving farming machinery.

By arranging the running gear of the truck as described with the frame 12 extending entirely in front of the transverse axial line of the front wheels, the weight of the motor and accessory parts supported by such frame is well forward and supported mostly by the front wheels, with the result that the latter are held firmly on the ground, making the steering of the truck positive and insuring that the front wheels shall not be lifted under heavy traction either entirely from the ground or so that they rest so lightly thereon that the truck cannot be properly controlled. These are features of especial advantage in a truck subject to the rough usage incident to farm work where the truck is called upon to do much of its traveling over comparatively soft ground. The arrangement of the running gear is simple and yet strong. It facilitates the ready separation of the two V-shaped frames, 6 and 7, and the pairs of wheels with which they are respectively united, which is often desirable in making repairs and for other reasons.

What I claim is:—

1. A motor truck comprising a pair of front steering wheels, a pair of rear drive wheels, axles by which the said wheels are supported, a running gear between and uniting the said axles and consisting of a frame supported by the front wheels, another frame supported by the rear wheels, and means for uniting these frames, and a frame for the motor and accessories thereto extending forwardly beyond the said running gear.

2. A motor truck comprising a pair of front steering wheels, stub axles supporting the said wheels, a pair of rear drive wheels, an axle by which the rear wheels are supported, a running gear extending between and connecting the wheels and their axles, comprising a V-shaped frame, the diverging end of which is supported by the front wheels, a second V-shaped frame the diverging end of which is supported by the rear wheels, the said frames overlapping each other, and means for uniting the said frames, springs interposed between the stub axles of the front wheels and the running gear, whereby the forward portion of the latter is spring-supported, and a frame for the motor and accessories thereto extending forwardly beyond the said running gear.

3. A motor truck, comprising a pair of rear drive wheels supported upon a cross axle, a pair of front steering wheels supported by short-turning stub axles, a running gear between and connecting said sets of wheels, a frame for the motor and accessories thereto, extending forwardly beyond the running gear and the front steering wheels, a gear casing supported upon the rear axle, and a longitudinally arranged, substantially horizontal sheath disposed above the said connecting running gear, and supported at its rear end by the said casing at its highest part, and at its forward end by the running gear, and adapted to inclose the shaft from the motor that drives the rear wheels.

4. A motor truck comprising a pair of rear drive wheels supported upon a cross axle, a pair of front steering wheels supported by short-turning stub axles, a running gear between and connecting the said sets of wheels, a frame for the motor and the accessories thereto extending forwardly beyond the running gear and the front steering wheels, a gear casing surrounding and supported upon the rear axle, a longitudinally arranged sheath, supported at its rear end by the said casing above the rear axle and at its forward end by the running gear, adapted to inclose the shaft from the motor that drives the rear wheels, and a brace secured at its forward end to the said sheath and at its rear end to the said casing below the rear axle.

5. A motor truck comprising a pair of rear drive wheels supported upon a cross axle, a pair of front steering wheels supported upon short-turning stub axles, a running gear uniting the said sets of wheels and consisting of a V-shaped frame connected at its diverging end with and supported by the rear axle, a cross bar uniting the diverging portions of the said frame, and another V-shaped frame the diverging portions of which are connected with the bearings in which are supported the vertical spindles of the stub axles for the steering wheels, the said frame extending under the V-shaped frame connected with the rear axle and having its apex united with the said cross bar of the rear diverging frame, and a frame for the motor and accessories thereto extending forwardly entirely beyond the said running gear.

LINTON T. BASSETT.

Copies of this patent may be obtained for five cents each, by addressing the "Commissioner of Patents, Washington, D. C."